April 13, 1943.    F. H. PARKS    2,316,534

PROTRACTOR

Filed Aug. 1, 1941

INVENTOR
FRANK H. PARKS.
BY
ATTORNEY.

Patented Apr. 13, 1943

2,316,534

UNITED STATES PATENT OFFICE 2,316,534
PROTRACTOR
Frank H. Parks, Portland, Oreg.
Application August 1, 1941, Serial No. 405,030
1 Claim. (Cl. 33—75)

This invention relates generally to navigation instruments and particularly to protractors.

The main object of this invention is to construct a protractor especially adapted for assisting a mariner in setting his course with the aid of a magnetic compass after the ships position has been determined by observation of two or more known charted landmarks or signals, or in any other manner such as by means of a radio beam.

The second object is to construct a protractor which automatically sets off the local magnetic variation once the protractor is set for this particular variation.

The third object is to construct a protractor of the class described whereby reckoning is reduced to a minimum and the time required for making a reckoning is relatively short, and the accuracy of the reckoning is increased materially due to the extreme simplicity of the operations involved.

These and other objects are accomplished in the manner set forth in the following specification as illustrated in the accompanying drawing, in which.

Similar numerals refer to similar parts throughout the several views.

Figure 1:
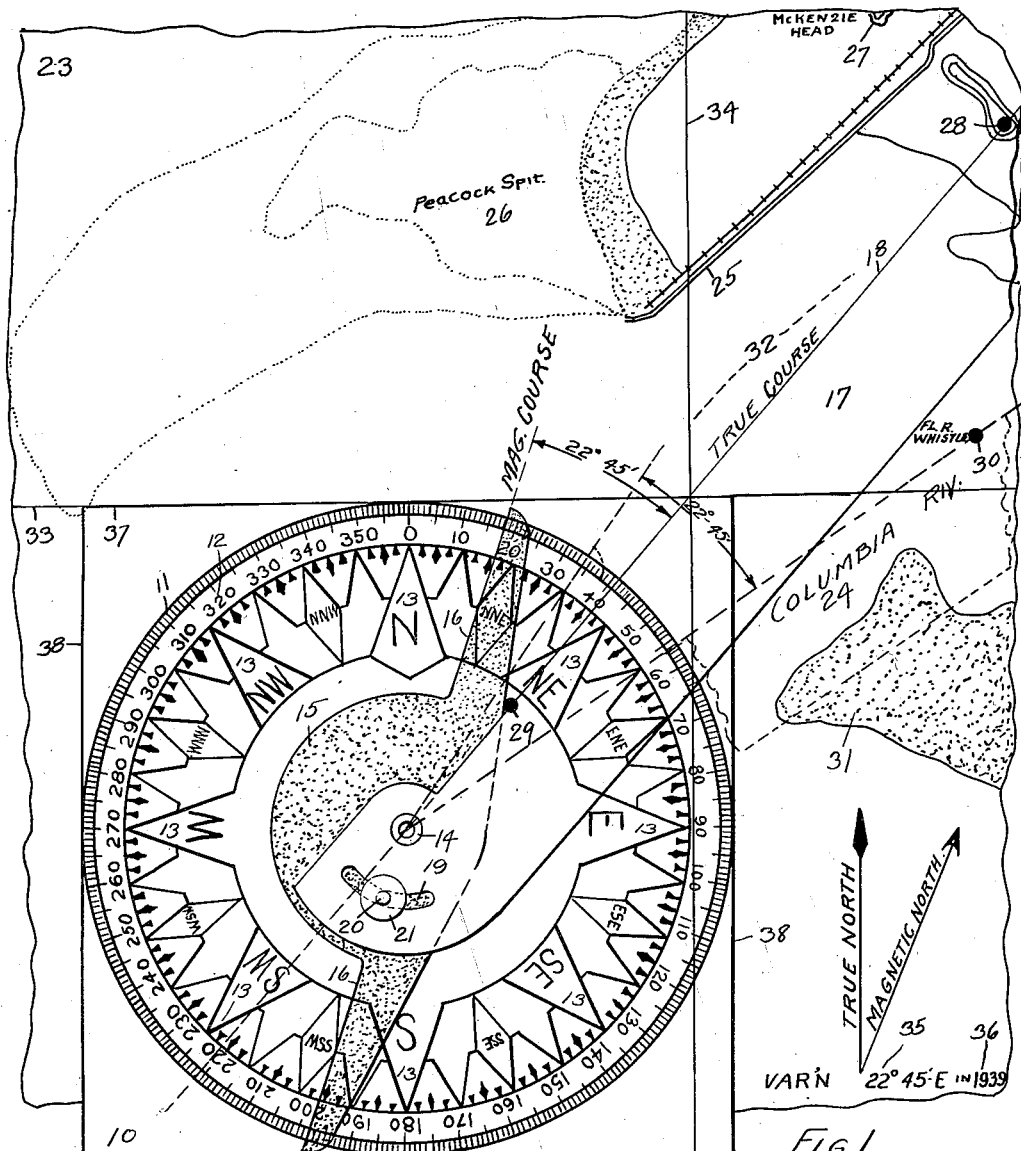
Fig. 1 is a plan of the device showing same in position on a map or chart.
Figure 2:
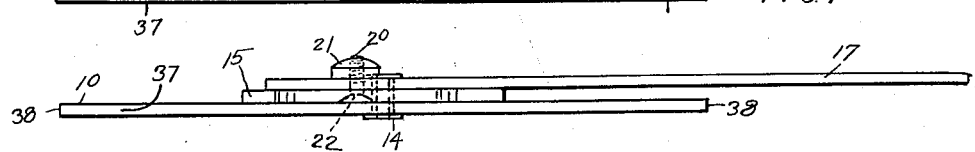
Fig. 2 is an edge elevation of the device in which the thickness of the parts is magnified for the sake of clearness.

Referring in detail to the drawing, the device will be seen to consist of three principal parts. Upon the protractor base 10 are etched or printed the calibrations 11 indicating the degrees of a circle. The characters 12 for each tenth degree are indicated as well as the compass points 13.

The protractor base 10 is preferably of a transparent material such as Celluloid or any of the well known plastic materials.

In the center of the base 10 is mounted a tubular rivet 14 upon which is rotatably mounted the magnetic course arm 15 preferably of colored or sanded material of reduced transparency. The magnet course arm 15 has the radial sides 16 which are in alinement with each other and occupy a plane passing through the axis of the rivet 14.

Also mounted on the rivet 14 is a transparent arm 17 whose edge 18 is also in alinement with the axis of the rivet 14. The arm 17 may be of any convenient length, in actual practice being approximately eighteen inches long.

The arm 17 is provided with an arcuate slot 19 through which extends a clamping screw 20 whose nut 21 is on the outside of the member 17 while its head 22 is recessed in the underside of the member 15. The purpose of the screw 20 is to make it possible to clamp the members 15 and 17 together at an angle corresponding with the local variation. The arm 17 is also preferably transparent although not necessarily so.

In order to give a clear understanding of the operation of this device and the utility thereof, there is shown a portion of a marine chart 23 with sufficient topography to illustrate the purposes and advantages of the present invention.

On the chart is indicated the entrance 24 of the Columbia River with a jetty 25, a sand spit 26, McKenzie Head 27, the light house 28, the harbor lights 29 and 30, and a second sand spit 31 between which and the spit 26 is located the main channel 32. On the chart 23 are also indicated a parallel 33 and meridian 34. The chart also shows the variation 35 in degrees and minutes for a given year 36. In this particular case, the variation is twenty-two degrees and forty-five minutes east in the year 1939.

The operation of the device is as follows:

When navigating within the area covered by the chart 23, the first operation to perform is to set the arm 15 with relation to the arm 17 so as to make the angle between the edges 16 and 18 correspond with the variation 35 indicated on the chart 23, and to clamp same in this position by means of the nut 21.

Now, if it is desired to set a course, an observation is made when two known points or lights are in alinement. In the present illustration, the observation is made when the lights 28 and 29 are in alinement.

The observer then places the edge 18 of his instrument on the chart 23 intersecting the points 28 and 29 and then slides the base 10 along the chart 23 until one of the edges 27 or 38 are in register with a parallel 33 or meridian 34. Obviously he will find it necessary to turn the base 10 with relation to the arm 17 in order to accomplish this purpose.

Having oriented his instrument as explained, he may now wish to steer in the direction of the flashing red harbor light 30 which may at that moment be visible. He then turns the arm 17 to the position shown in dotted lines so that the edge 18 will intersect the harbor light 30 and the center of the rivet 14, and he finds that although the true course arm 17 indicates a course of 56° and 45', his magnetic course is indicated at 34° east. That is, since the magnetic variation is 22° and 45' east of north in this locality, then his compass course must be that amount less than the course he wishes to navigate.

It is a well known fact that protractors have long been used for the purpose of plotting a ship's course from charts, examples of which are shown in the patent to Nash, 175,488. Such devices are based upon the assumption that the location of the vessel is known and that the designation point is visible.

With my device, it is only necessary to maneuver the vessel into alinement with two known points in order to determine the line on the chart along which the vessel lies, and the angularity of the course to be taken is measured on the chart, and the magnetic variation accounted for and given to the navigator; the magnetic course to be followed by the vessel in order to remain in the line of the lights. This course can be followed as long as desired.

If he wishes to change his course, he places his ship into alinement with two points which will permit him to determine the new magnetic reading which will be transmitted to the pilot house.

Obviously, the intersecting points of any two courses will give the precise location of the ship itself.

It will be noted that with my device, the true meridian pointer is not separate from the compass chart, but is a part thereof, and the base 10 having four sides 37 and 38 has the equivalent of four pointers in addition to the intersections between the zero and 180° mark and the 90° and 270° mark, thereby affording six possible lines for registering with meridians and parallels.

Attention is drawn to the fact that the magnetic course arm 15 is double ended. That is, it projects on opposite sides of the pivot 14. The purpose of this is to enable the mariner to determine the course in either direction.

I claim:

A protractor having a rectangular transparent base on the surface of which is formed a compass dial having a pivot disposed at the center thereof, a transparent true course arm mounted on said pivot and having one edge thereof in alinement thereto, said true course arm having an arcuate slot formed therethrough, the center of which is the center of the pivot, a magnetic course arm also mounted on said pivot and having an end extending across the face of said dial, both ends of said magnetic course arm being in alinement with each other and radial from said pivot, and a clamping screw passing through the slot in said true course arm into said magnetic course arm whereby the magnetic declination may be set off and held at a fixed value while said true and magnetic course arms are permitted to rotate on said pivot.

FRANK H. PARKS.